United States Patent [19]
Pfuntner et al.

[11] 3,994,165
[45] Nov. 30, 1976

[54] MASS FLOWMETER STARTING SYSTEM

[75] Inventors: Richard A. Pfuntner, Bradford; Gerfried M. Gozemba, Peabody, both of Mass.

[73] Assignee: The United States of America as represented by the Secretary of the Air Force, Washington, D.C.

[22] Filed: Nov. 25, 1975

[21] Appl. No.: 635,001

[52] U.S. Cl. ............................. 73/194 M; 318/171
[51] Int. Cl.² .......................................... G01F 1/82
[58] Field of Search .................... 73/194 M, 231 M; 318/171, 174

[56] References Cited
UNITED STATES PATENTS

| | | | |
|---|---|---|---|
| 2,714,310 | 8/1955 | Vennings | 73/194 M |
| 2,852,726 | 9/1958 | Ocnaschek | 318/171 |
| 3,276,258 | 10/1966 | Rowley | 73/194 M |
| 3,855,510 | 12/1974 | Houck | 318/171 |

*Primary Examiner*—Charles A. Ruehl
*Attorney, Agent, or Firm*—Joseph E. Rusz; Robert Kern Duncan

[57] ABSTRACT

A Zener diode voltage sensing circuit senses when the 115 volt, 400 Hz primary power source to a conventional 8 Hz two-phase mass flowmeter is below approximately 80 volts and through an amplifier, a frequency halving flip-flop, and a quad NAND gate halves the frequency from 8 Hz to 4 Hz so that the impeller of the two-phase drive motor will start or continue rotating, then as the primary voltage rises above the 80 volt predetermined amount, and after approximately a one-second delay, the 4 Hz, two-phase drive frequency is changed to the normal two-phase 8 Hz impeller driver voltage.

1 Claim, 4 Drawing Figures

U.S. Patent    Nov. 30, 1976    Sheet 1 of 3    3,994,165
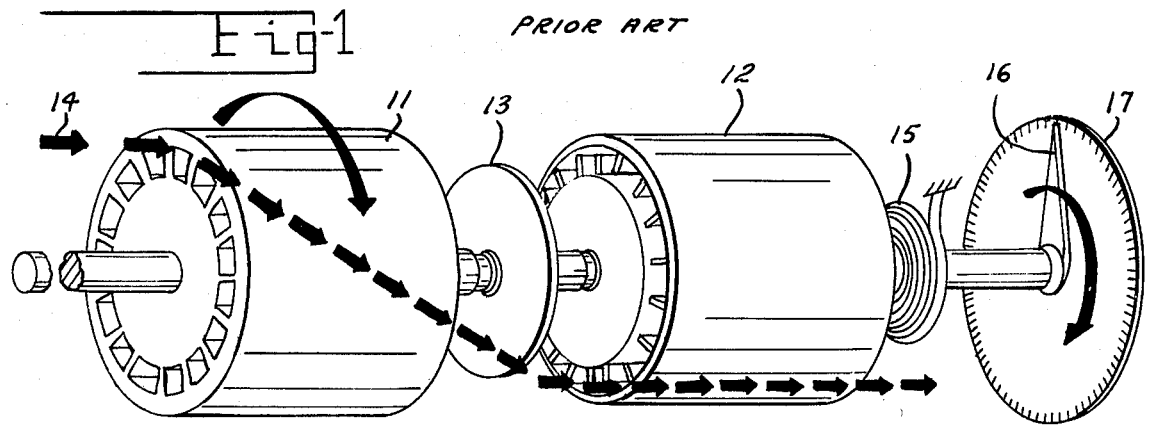
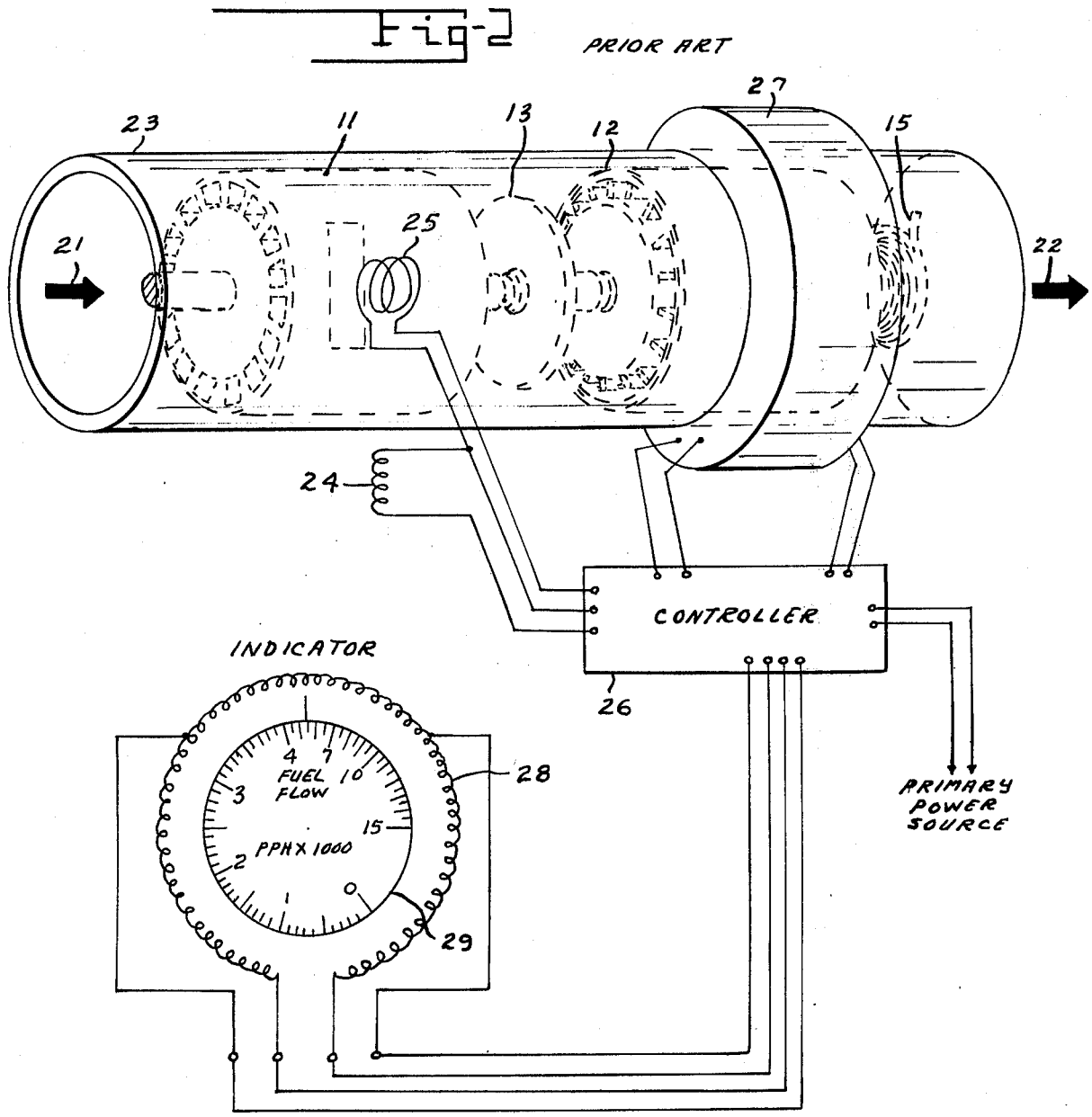

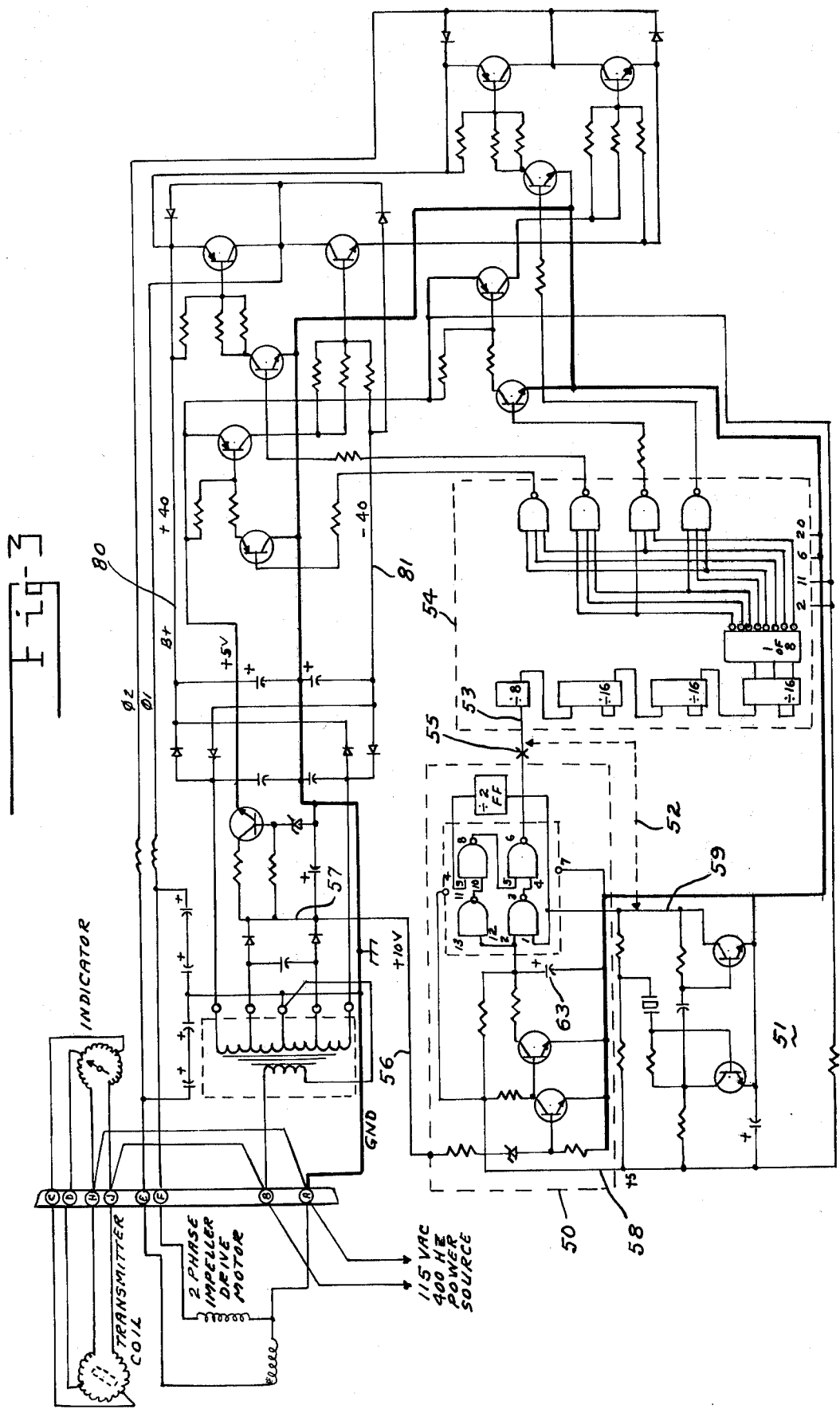

MASS FLOWMETER STARTING SYSTEM

RIGHTS OF THE GOVERNMENT

The invention described herein may be manufactured and used by or for the Government of the United States for all governmental purposes without the payment of any royalty.

BACKGROUND OF THE INVENTION

The field of the invention is in mass flowmeter instrumentation and particularly in the electronic circuitry art for mass flowmeters.

Mass flowmeters are well known and in wide usage. A typical examples where mass flowmeters are widely used is in the measurement of the fuel flowing into a jet aircraft engine. Mass flowmeters are used to indicate the pounds per hour of fuel flow independent of the absolute values of the density of the fuel and its velocity of flow. In order to fully comprehend this invention it is necessary that the operation of conventional mass flowmeters be understood. Typical prior art devices are schematically represented in FIGS. 1 and 2. The fluid mechanics of the system is illustrated in FIG. 1. The flow sensing means is comprised of two similar rotors 11 and 12 placed coaxially end-to-end, suspended for independent rotation, and separated axially only a small amount occasioned by the stationary disc separator 13. The upstream rotor 11 is commonly referred to as the impeller and the downstream rotor 12 the turbine. Each rotor is comprised of a pair of concentric cylinders with radial vanes dividing the annular space between them into a number of identical flow passages. They are enclosed in a common cylindrical housing in which radial clearances are small enough to prevent appreciable fuel flow around the rotors.

The impeller 11 is driven at constant angular velocity. Each unit mass of fuel (as represented by the small arrows 14) in transit emerges from the impeller flow passages with the angular velocity of the impeller. By virtue of this angular velocity, each unit mass of fuel enters the flow passages of the turbine 12 with angular momentum proportional to impeller speed, but independent of flow rate, fuel density and viscosity, and other ambient conditions. All the angular momentum imparted to the fuel by the impeller is recovered by the turbine so that, in accordance with Newton's Law, the fuel exerts on the turbine 12 a torque directly proportional to the product of mass flow rate and impeller speed.

The turbine 12 is restrained by a spring 15 to deflect through an angle of arc proportional to the torque exerted upon it by the fuel. This angle of rotation, of the turbine 12, moves the pointer 16 across the face of a dial 17 on which the calibration of the corresponding rates of flow are engraved.

FIG. 2 schematically illustrates a conventional control and indicating arrangement as is usually used to drive the impeller and sense and indicate the movement of the turbine; the movement of which is indicative of the mass-flow of the fluids. The fluid flow 21–22 is through the conduit 23 from the fuel source to the item of utilization, typical from a fuel tank to a jet engine. The impeller 11, supported on low friction bearings, is conventionally driven in angular rotation by a two-phase 8 Hz signal in the quadrature coils 24 and 25 which is supplied by the controller 26. These coils are located outside of the fluid conduit 23. The movement of the turbine 12 is sensed by a conventional repeater system (such as a selsyn or synchro type system) having transmitter coil 27 and remote indicator coil 28. The indicator coil 28 conventionally drives the indicator card 29 to an angular position corresponding to the angular movement that the turbine 12 is moved against the restoring force of spring 15 by the mass-flow of the fluid 21–22 passing through the system. The card 29 is conventionally calibrated to indicate the mass fuel flow in pounds-per-hour, or multiples thereof.

Prior to this invention a severe impeller starting problem had existed with aircraft having low primary voltage during the startup cycle or at any time the nominal 115 v 400 Hz primary voltage dropped to less than about 80 volts and then was slow to regain a nominal 115 volt value. One of the reasons for difficulty in starting the impeller with low primary voltage is due to the eddy currents in the aluminum conduit or housing 23 separating the two-phase starter windings 24 and 25 from the permanent magnet rotor in the impeller. These eddy current losses can be reduced by using a titanium or other higher resistance housing, but of a great expense. Another way that has been attempted to make the impeller easier to start has been to incorporate swirl vanes to provide a flow assist effect but swirl vanes cause an increased pressure drop and in most applications, particularly military, an extremely low pressure drop is a requirement that is placed on the mass flowmeter transmitter so that maximum fuel flow with minimum pump energy is obtained. Obviously providing sufficient power at 8 Hz to start under all conditions of temperature, low voltage, and high flow is impractical because of indicator power limitations and the cost of the required higher rated electronic components. Thus, it was highly desirable to discover some means of starting the two-phase synchronous 8 Hz impeller at a lower voltage than its nominal designed voltage. It has been found that once the impeller is in rotational motion, it will lock into synchronism and properly function at voltages of about 80 volts and above, but that it is normally incapable of starting at voltages approximately equal to or less than 80 volts. It is during the startup period when voltages are low that it is also very important to know the fuel flow into the engine.

Typical examples of the prior art in connection with the starting of synchronous motors are exemplified by U.S. Pat. Nos. 3,408,547 to patentee W. Saeger; 3,855,510 to patentee D. J. Houck; 3,219,897 to patentee A. Beltrami and 3,582,735 to patentee A. P. Maruschak.

SUMMARY OF THE INVENTION

An economical, simple, and reliable system for starting the synchronous impeller rotors of mass flowmeters under conditions of low primary live voltage is disclosed.

BRIEF DESCRIPTION OF THE DRAWING

FIG. 1 is a schematic-pictorial representation of the transmitter structure of a mass flowmeter;

FIG. 2 is a schematic-pictorial representation of a complete mass flowmeter system;

FIG. 3 is an electrical schematic diagram of an improved mass flowmeter; and

DESCRIPTION OF THE PREFERRED EMBODIMENT

Figure 4:
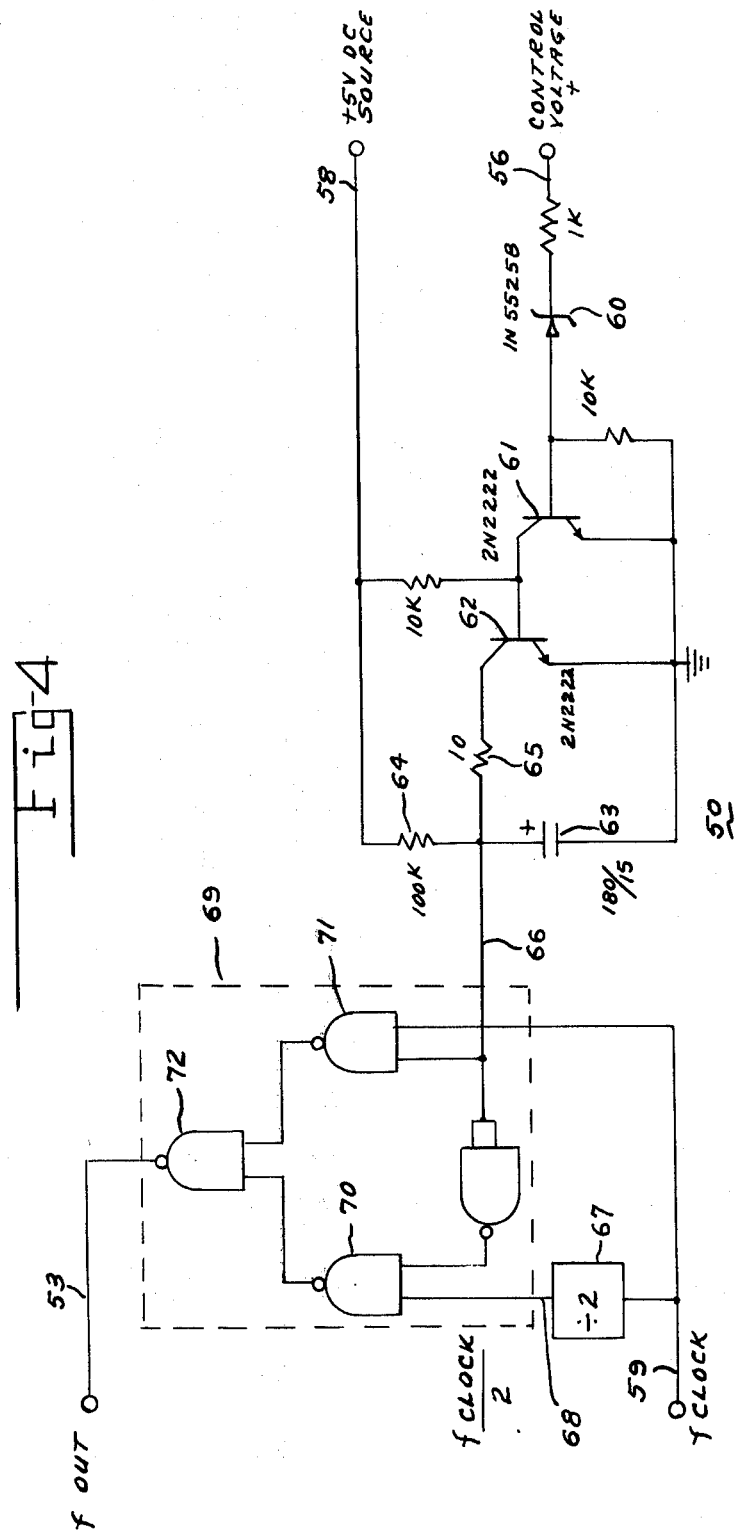
FIG. 4 is a detailed electrical schematic diagram of the frequency control citcuit.

It has been discovered that the utility of a conventional 8 Hz mass flowmeter system can be greatly increased and an improved mass flowmeter system provided by providing an electronic control system that at start, or at any other time when the primary line voltage becomes less than a predetermined set value, reduces the 8Hz to 4 Hz for the period that the voltage is lower than the set value and for a determined time interval after the predetermined set value is regained before switching to the 8 Hz operating frequency. With a nominal 115 volt 400 Hz primary voltage the optimum magnitude of this predetermined set value has been found to be approximately 80 volts. It has also been found that adding an additional divide-by-two stage so that the normal 8 Hz that is obtained by counting down the frequency from a crystal oscillator, is further reduced to 4 Hz when the primary line drops below the approximately 80 volt value will enable the impeller in the transmitter to start rotating. The divide-by-two stage is removed as the primary voltage rises above the 80 volt value where synchronization of the impeller rotor with the 8 Hz signal will be obtained provided the impeller was previously rotating at the 4 Hz rate. The transition is delayed for approximately one second to assure stable transmitter operation at 4 Hz before switching to 8 Hz. This delay is not critical in duration but some delay is important to prevent hunting and instable operation (with switching back and forth) as the primary voltage may tend to waver slightly during its rising to the nominal value. Approximately a one-second delay has been found optimum to provide stable operation yet get the system to functioning normally as soon as practical.

Referring to FIG. 3, if the modification 50 is removed from the circuit and the crystal oscillator 51 is connected by conductor 52, shown dotted, to the input 53 of the countdown frequency-phase control system 54, and the line from the modification circuit opened at point 55 a conventional 8 Hz, prior art, mass flowmeter is obtained. The modification 50, improving the conventional mass flowmeter circuit, senses a reference voltage on line 56, connected to existing line 57 of the power supply, that is proportional to the primary line voltage and has a nominal value of approximately 10 volts dc when the primary voltage is approximately 115 volts ac. The frequency of the signals on line 53 is then controlled by the apparatus of this invention to be either approximately 262 KHz or approximately 131 KHz in accord with normal primary line voltage, or low line voltage, respectively.

An enlarged, detailed, schematic diagram of the improvement circuit alone is shown in FIG. 4. The connections with the conventional circuit are the same as shown in FIG. 3. A line 59 connects with the clock frequency (oscillator) output from the crystal oscillator. Line 56 connects to the monitored voltage, line 58 connects to a five-volt dc power source, and line 53 carrying either the clock (oscillator) frequency or one-half the clock frequency connects to the countdown divider in the conventional circuit. The improvement circuit comprises essentially five functional circuits. A voltage sensing circuit comprising a seven-volt Zener reference voltage diode 60 keeps the base of transistor 61 substantially at that potential until the primary line potential drops below approximately 80 volts. A dc amplifier comprising transistors 61 and 62, amplifies the dc voltage from the Zener diode and provides a low impedance control voltage output. An RC time delay circuit comprising capacitor 63 and resistor 64 cooperates with the output impedance of the dc amplifier through resistor 65 and determines the time delay interval between a switching change in the control voltage on line 56 and a corresponding switching level change on line 66. A conventional divide-by-two flip-flop 67 provides pulses on line 68 at one-half the frequency of the pulses on line 59. And a conventional quad NAND gate 69 receives clock pulses on line 59, clock/2 pulses on line 68 and a binary "one" or a "zero" signal on line 66 according to the magnitude of the charge on capacitor 63, and provides an output on line 53 of either clock frequency or one-half clock frequency.

By way of further explanation of the operation of the circuit, when the control voltage on line 56 is larger than approximately seven volts, Zener diode 60 conducts and the base of transistor 61 is placed at substantially this potential, (actually 10/11 of it), placing it in heavy conduction. This lowers the potential on the base of transistor 62 substantially to ground potential substantially cutting if off and permitting the charge on capacitor 63 to rise to approximately five volts. A high potential, (a one), on line 66 inhibits the f/2 pulses at the output of NAND gate 70 and provides for clock pulses to flow through gates 71 and 72 down line 53 to the conventional divider in the conventional control circuit which then drives the impeller rotor of the transmitter at 8 Hz. When the voltage on line 56 drops, or is below approximately seven volts, as in an initial startup, Zener diode 60 opens (or is open) and the potential on the base of transistor 61 goes to ground potential cutting off transistor 61. The base of transistor 62 rises placing it in heavy conduction with a lowering of the voltage on line 66, the charge voltage of capacitor 63. This provides a zero on line 66 to the quad NAND gates 69 and the frequency of the output on line 53 to the conventional divider that is one-half the clock frequency. The system then operates at 4 Hz to drive the impeller of the transmitter. The impeller will thus start rotating at the 4 Hz rate at voltages as low as approximately one-half the voltage required to start it at the 8 Hz rate due to the lower losses in coupling the electrical energy from the impeller stator to the impeller rotor and the decreased frictional drag imposed on the impeller by its environment. Thus, it has been found that at 4 Hz approximately 20 volts plus and minus on lines 80 and 81 respectively (FIG. 3) will start the impeller and synchronize it to 4 Hz. That is equivalent to one-half primary line voltage. Then with the impeller turning, as the primary line voltage rises above approximately 80 volts the drive frequency is changed to 8 Hz, after approximately a one-second delay required to change the charge on capacitor 63 sufficiently to change the logic to the NAND gates. At voltages above that figure (80 volts) impeller will lock into synchronism at the 8 Hz rate and the mass flowmeter will function normally to give accurate flow readings for all primary line voltages above 80 volts. Without this invention the impeller would not commence rotation at voltages below approximately 105 volts and would cease to rotate at approximately 75 volts (when previously rotating) and would not start up again until the primary voltage reached approximately the 105 volt value. Thus, this invention has economically, expediently, and easily, greatly improved the utility of mass flowmeters that must operate at times under low values of primary line voltages.

We claim:

1. The improvement in a mass flowmeter system operating from a nominal 115 volt primary ac line and providing an 8 Hz signal counted down in a countdown circuit from a high frequency oscillator of frequency f, for rotating the impeller rotor of the transmitter of the said mass flowmeter, the said improvement for rotating the said impeller under conditions of low primary line voltage comprising:

- a. means for sensing the said 115 volt primary line and providing a first signal when the said primary line voltage is below approximately 80 volts, and providing a second signal when the said primary line voltage is above approximately 80 volts;
- b. a divide-by-two circuit cooperating with the said fixed frequency oscillator providing an output frequency of f/2;
- c. a dc amplifier cooperating with the said sensing means and providing a first voltage potential responsive to the said first signal and a second voltage potential responsive to the said second signal;
- d. a quad NAND gate having a first input receiving the frequency f, a second input receiving the said frequency f/2, a first and a second state binary switching input, and an output responsive to the said first f input and the said second f/2 input and the said switching input providing an output signal of frequency f responsive to a first state of the said binary switching input and an output signal of frequency f/2 responsive to the said second state of the said binary switching input;
- f. means for connecting the output of the said quad NAND gate to the said countdown circuit whereby the said signal rotating the said impeller is 4 Hz when the said primary line voltage is below approximately 80 volts and 8 Hz when the said primary line voltage is above approximately 80 volts; and
- g. an RC time constant circuit comprising a capacitor and a resistor cooperating with the output of the said dc amplifier and the switching input of the said quad NAND gate, for actuating the said first and second switching states of the said quad NAND gates and providing approximately a one-second delay in switching the said quad NAND gate after the said sensing means provides the said second signal.

* * * * *